United States Patent [19]
Gulick

[11] Patent Number: 6,101,560
[45] Date of Patent: *Aug. 8, 2000

[54] PARTITIONED PC GAME PORT

[75] Inventor: Dale E. Gulick, Austin, Tex.

[73] Assignee: Advanced Micro Devices, Inc., Sunnyvale, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/866,652

[22] Filed: May 30, 1997

Related U.S. Application Data

[63] Continuation-in-part of application No. 08/802,321, Feb. 18, 1997.

[51] Int. Cl.[7] .................................................. G06F 13/00
[52] U.S. Cl. ................................ 710/62; 710/1; 710/61
[58] Field of Search ........................... 345/156; 710/61, 710/62, 1, 2, 7, 11, 38, 45

[56] References Cited

U.S. PATENT DOCUMENTS

| | | | |
|---|---|---|---|
| 4,347,603 | 8/1982 | Jacob et al. | 370/85 |
| 4,519,034 | 5/1985 | Smith et al. | 364/200 |
| 4,683,530 | 7/1987 | Quatse | 364/200 |
| 4,726,040 | 2/1988 | Acampora | 375/75 |
| 5,245,320 | 9/1993 | Bouton | 395/167 |
| 5,390,191 | 2/1995 | Shiono et al. | 371/22.3 |
| 5,410,542 | 4/1995 | Gerbehy et al. | 370/85.1 |
| 5,455,740 | 10/1995 | Burns | 361/735 |
| 5,457,785 | 10/1995 | Kikinis et al. | 395/308 |
| 5,459,487 | 10/1995 | Bouton | 395/156 |
| 5,553,220 | 9/1996 | Keene | 395/154 |
| 5,557,757 | 9/1996 | Gephardt et al. | 395/306 |
| 5,566,306 | 10/1996 | Ishida | 395/309 |
| 5,696,912 | 12/1997 | Bicevskis et al. | 395/308 |
| 5,727,171 | 3/1998 | Iachetta et al. | 395/287 |
| 5,734,840 | 3/1998 | Chew et al. | 395/282 |
| 5,740,387 | 4/1998 | Lambrecht et al. | 395/309 |
| 5,754,826 | 5/1998 | Adan et al. | 395/500 |
| 5,765,186 | 6/1998 | Searby | 711/100 |
| 5,784,291 | 7/1998 | Chen et al. | 364/491 |
| 5,812,800 | 9/1998 | Gulick et al. | 395/308 |
| 5,816,921 | 10/1998 | Hosokawa | 463/43 |
| 5,819,034 | 10/1998 | Joseph et al. | 395/200.31 |
| 5,822,550 | 10/1998 | Milhaupt et al. | 395/306 |

OTHER PUBLICATIONS

Intel, "82371FB (PIIX) and 82371SB (PIIX3) PCI ISA IDE Xcelerator", May 1996, pp. 1–118.
Common Architecture, "Desktop PC/AT systems", Mar. 21, 1996, Version.93 Preliminary, pp. 1–26.
Advanced Micro Devices, "AM7968/Am7969 TAXIchip™ Article Reprints", Jan. 22, 1987, pp. 1–77, particularly pp. 67–72.
National Semiconductor, "PC87306 SuperI/O™ Enhanced Sidewinder Lite Floppy Disk Controller, Keyboard Controller, Real–Time Clock, Dual UARTs, Infrared Interface, IEEE 1284 Parallel Port, and IDE Interface", Preliminary—Nov. 1995, pp. 1–110.
Fernald, Kenneth W. et al., A System Architecture for Intelligent Implantable Bioelementry Instruments, IEEE Engineering in Medicine & Biology Society 11th Annual International Conference, 1989, pp. 1411–1412.
Bertstein, Herbert, "Gute Bus–Verbindungen", 2087 Elektronik 43 (1994) Sep. 6, No. 18, Poing, DE, pp. 110–115.
Messmer, Hans–Peter, "The Indispensable PC Hardware Book—Your Hardware Questions Answered", published by Addison–Wesley, 1995, pp. 889–893.

*Primary Examiner*—Glenn A. Auve
*Assistant Examiner*—Tim Vo
*Attorney, Agent, or Firm*—Zagorin, O'Brien & Graham, LLP

[57] ABSTRACT

An apparatus includes a game port interface and a bus. The game port interface includes first and second game port portions. The first game port portion is on a first integrated circuit and interfaces to an I/O bus. The second game port portion is on a second integrated circuit and provides I/O terminals to couple the game port interface to a peripheral device. The bus couples the first and second integrated circuits. The bus is for serially transferring game port information between the first and second game port portions.

24 Claims, 15 Drawing Sheets

| Bit# | TRANSMIT TO PEC Function |
|---|---|
| 0 | Command Valid |
| 1 | Link command bit 0 |
| 2 | bit 1 |
| 3 | bit 2 |
| 4 | bit 3 |
| 5 | bit 4 |
| 6 | bit 5 |
| 7 | bit 6 |
| 8 | Link command bit 7 |
| 9 | Reserved |
| 10 | Reserved |
| 11 | Reserved |
| 12 | Reserved |
| 13 | Reserved |
| 14 | Reserved |
| 15 | Reserved |
| 16 | Reserved |
| 17 | Reserved |
| 18 | Reserved |
| 19 | Reserved |
| 20 | Reserved |
| 21 | Reserved |
| 22 | Reserved |
| 23 | Reserved |
| 24 | Reserved |
| 25 | Reserved |
| 26 | Reserved |
| 27 | Reserved |
| 28 | Reserved |
| 29 | Reserved |
| 30 | Reserved |
| 31 | Reserved |
| 32 | Floppy WGATE/ |
| 33 | Floppy HDSEL/ |
| 34 | Floppy DIR/ |
| 35 | Floppy STEP/ |
| 36 | Floppy MTR0/ |
| 37 | Floppy MTR1/ |
| 38 | Floppy DR0/ |
| 39 | Floppy DR1/ |
| 40 | Floppy DENSEL |
| 41 | Floppy DRATE0 |
| 42 | Floppy DRATE1 |
| 43 | Reserved |
| 44 | Reserved |
| 45 | Reserved |
| 46 | Reserved |
| 47 | Reserved |

| Bit# | TRANSMIT TO PEC Function |
|---|---|
| 48 | Serial port 0 RTS/ |
| 49 | Serial port 0 DTR/ |
| 50 | Serial port TD |
| 51 | Reserved |
| 52 | Reserved |
| 53 | Serial port 1 RTS/ (or kybd tx) |
| 54 | Serial port 1 DTR/(or IrDA or mouse) |
| 55 | Serial port 1 TD (or IrDA or mouse) |
| 56 | Reserved (or IrDA or mouse) |
| 57 | Reserved (or IrDA or mouse) |
| 58 | Reserved |
| 59 | Reserved |
| 60 | Reserved |
| 61 | Reserved |
| 62 | Reserved |
| 63 | Reserved |
| 64 | Reserved |
| 65 | Game X0 request |
| 66 | Game X1 request |
| 67 | Game Y0 request |
| 68 | Game Y1 request |
| 69 | Reserved |
| 70 | Reserved |
| 71 | Reserved |
| 72 | Reserved |
| 73 | Reserved |
| 74 | Reserved |
| 75 | Reserved |
| 76 | Reserved |
| 77 | Reserved |
| 78 | Reserved |
| 79 | Reserved |
| 80 | Reserved |
| 81 | Reserved |
| 82 | PC speaker out |
| 83 | MIDI TX |
| 84 | User interface out |
| 85 | User interface out |
| 86 | User interface out |
| 87 | User interface out |
| 88 | User interface out |
| 89 | User interface out |
| 90 | User interface out |
| 91 | User interface out |
| 92 | User interface out |
| 93 | User interface out |
| 94 | User interface out |
| 95 | User interface out |

*FIG. 8A*

| Bit# | TRANSMIT FROM PEC Function |
|---|---|
| 0 | Response/status |
| 1 | Link status bit 0 |
| 2 | bit 1 |
| 3 | bit 2 |
| 4 | bit 3 |
| 5 | bit 4 |
| 6 | bit 5 |
| 7 | bit 6 |
| 8 | Link status bit 7 |
| 9 | Reserved |
| 10 | Reserved |
| 11 | Reserved |
| 12 | Reserved |
| 13 | Reserved |
| 14 | Reserved |
| 15 | Reserved |
| 16 | Reserved |
| 17 | Reserved |
| 18 | Reserved |
| 19 | Reserved |
| 20 | Reserved |
| 21 | Reserved |
| 22 | Reserved |
| 23 | Reserved |
| 24 | Reserved |
| 25 | Reserved |
| 26 | Reserved |
| 27 | Reserved |
| 28 | Reserved |
| 29 | Reserved |
| 30 | Reserved |
| 31 | Reserved |
| 32 | Floppy TRK0/ |
| 33 | Floppy INDEX/ |
| 34 | Floppy DSKCHG/ |
| 35 | Floppy WP/ |
| 36 | Reserved |
| 37 | Reserved |
| 38 | Reserved |
| 39 | Reserved |
| 40 | Reserved |
| 41 | Reserved |
| 42 | Reserved |
| 43 | Reserved |
| 44 | Reserved |
| 45 | Reserved |
| 46 | Reserved |
| 47 | Reserved |

| Bit# | TRANSMIT FROM PEC Function |
|---|---|
| 48 | Serial port 0 CTS/ |
| 49 | Serial port 0 DSR/ |
| 50 | Serial port 0 DCD/ |
| 51 | Serial port 0 RI |
| 52 | Serial port 0 RD |
| 53 | Serial port 1 CTS/(or kybd rx) |
| 54 | Serial port 1 DSR/(or IrDA or mouse) |
| 55 | Serial port 1 DCD/(or IrDA or mouse) |
| 56 | Serial port 1 RI (or IrDA or mouse) |
| 57 | Serial port 1 RD (or IrDA or mouse) |
| 58 | Reserved |
| 59 | Reserved |
| 60 | Reserved |
| 61 | Reserved |
| 62 | Reserved |
| 63 | Reserved |
| 64 | Reserved |
| 65 | Game X0 done |
| 66 | Game X1 done |
| 67 | Game Y0 done |
| 68 | Game Y1 done |
| 69 | Button 0 |
| 70 | Button 1 |
| 71 | Button 2 |
| 72 | Button 3 |
| 73 | Reserved |
| 74 | Reserved |
| 75 | Reserved |
| 76 | Reserved |
| 77 | Reserved |
| 78 | Reserved |
| 79 | Reserved |
| 80 | Reserved |
| 81 | Reserved |
| 82 | Reserved |
| 83 | MIDI RX |
| 84 | Vol + |
| 85 | Vol - |
| 86 | Mute |
| 87 | Keylock |
| 88 | Turbo |
| 89 | Setup disable |
| 90 | CLR CMOS |
| 91 | Sw 0 |
| 92 | SW1 |
| 93 | SW2 |
| 94 | SW3 |
| 95 | User interface in |

*FIG. 8B*

PARTITIONED PC GAME PORT

CROSS-REFERENCE TO RELATED APPLICATIONS

This application is a continuation-in-part of co-pending application, Ser. No. 08/802,321, filed on Feb. 18, 1997, and, entitled "System for Partitioning PC Chipset Functions into Logic and Port Integrated Circuits", by Dale E. Gulick, and which is incorporated herein by reference.

This application relates to co-pending application, Ser. No. 08/802,323 filed on Feb. 18, 1997, and, entitled "PC Chipset Interconnection Bus", by Dale E. Gulick, and which is incorporated herein by reference.

BACKGROUND

1. Field of Use

The present invention relates to computer systems, and, more particularly, to the partitioning of game port input/output functions.

2. Description of the Related Art

A typical personal computer (PC) system includes a microprocessor, associated memory and control logic and a number of peripheral devices that provide input and output for the system. Such peripheral devices typically include a display monitor, a keyboard and mouse, a floppy disk drive, a hard disk drive and a printer. The number of devices being added to personal computer systems continues to grow. For example, many computer systems also include modems, sound devices, and CD-ROM drives.

Historically, interfaces to peripherals utilized a large number of discrete components. However, the level of integration has continued to increase in PC systems. As a result, much of the functional logic which is required to interface with peripheral devices has been integrated into a relatively few integrated circuits (ICs) which are sold as chip sets for the PC. The ICs include a plurality of terminals, pins, or leads, connecting the IC to the printed circuit board (PCB) to which the IC is mounted. The PCB functions as a system board. The terminals communicate input/output (I/O) signals between one IC and other ICs or I/O devices coupled to the system board. ("I/O" commonly refers to input, output and/or input/output and typically describes signals, terminals, circuits, buses and/or devices.) These system boards often receive expansion PCBs to increase the capabilities of the computer system and to connect to peripheral devices through an expansion bus.

PC systems use one of several expansion bus architectures to facilitate communication between various components of the system and to provide the versatility needed to add additional components to the system. For example, the Industry Standard Architecture (ISA) provides an expansion bus for the 16-bit IBM AT personal computer. The Enhanced ISA (EISA) provides specifications for systems utilizing 32-bit microprocessors such as the Intel 80386 and 80486 microprocessors. The Peripheral Component Interconnect (PCI) bus provides a bus architecture for 32-bit or 64-bit interconnection systems independent of processor generation or family.

The ISA bus, originally called the Advanced Technology (AT) bus, added the functionality needed for full 16-bit technology, but maintained compatibility with an older 8-bit PC bus. Because of its initial speed and data-path match with the 80286 microprocessor, the original ISA bus substantially out-performed the PC bus. The ISA bus has resisted replacement by newer bus architectures such as EISA and Microchannel, and remains commonplace in personal computer systems in use today. This is true in part because many devices that are designed to interface with the ISA bus are in widespread use today. Such devices typically do not require the higher speed provided by the newer buses. Such devices are known as legacy devices since their design is based on older PC technology. Examples of such slower legacy devices include keyboards and mice, game port devices such as joysticks, floppy drives, modems connected to serial communication ports, printers connected to parallel communication ports, direct memory access (DMA) controllers, interrupt controllers and timers. Those legacy devices do not need the high speed throughput of the newer generation of buses such as EISA, Microchannel Architecture (MCA) and the Peripheral Component Interconnect (PCI) bus.

Although personal computer system speeds have increased dramatically, the speed of the ISA bus is limited to 8 MHz. As higher speed processors were utilized, dedicated memory buses were added to personal computer systems because the ISA bus was too slow for the required high speed memory accesses. Video applications also became limited by the bandwidth of the ISA, so systems began to use a "local bus" for video applications. Although initially targeted at advanced video systems, new local bus specifications were made broad enough for handling other peripherals requiring high-bandwidth transfers such as mass storage devices and network interfaces.

The Peripheral Component Interconnect (PCI) bus is one example of a local bus specification. The VL bus is another local bus specification that has been less widely adopted. The PCI bus provides a high-speed interconnection system which runs more closely to microprocessor speeds than does a traditional expansion bus. And, although initially designed for 32-bit microprocessors, the PCI specification is broad enough to include the 64-bit data paths of advanced processors. Legacy devices compatible with older bus architectures such as the ISA connect to the PCI bus via a bus bridge circuit.

Many present day personal computer systems contain both a PCI bus and an ISA bus. The PCI bus is used to connect to newer peripherals and/or those peripherals requiring a higher speed interface. The ISA bus is typically connected to legacy devices.

Referring to FIG. 1, an exemplary prior art computer system 100 is shown conforming to the above architectural approach of including both a PCI bus and an ISA bus. Computer system 100 includes processor 110 which is coupled to secondary cache 115 and memory 140. Bridge 120 provides an interface between the processor/memory system 105 and PCI bus 125. Bridge 120 provides a communication link between PCI devices 150, 160 and 170 and the processor/memory system 105. In fact, although the PCI bus was originally intended for graphics, high speed graphics requirements have resulted in another specialized graphics bus called the Advanced Graphics Port Bus which can be utilized in place of the PCI bus for graphics applications. The PCI devices may be integrated circuits on the system board of computer system 100, expansion components connected to PCI bus 125 via expansion slots, or some combination thereof. A second bridge 130, provides a bus interface between the PCI bus 125 the ISA expansion bus 135.

In order to communicate with legacy devices which are designed to interface to the ISA bus, one approach, consistent with the trend towards increased integration in the PC, has been to provide a Super I/O chip 170 rather than provide a number of discrete interfaces. Super I/O chip 170 provides I/O terminals and control logic for commonly used legacy peripheral devices such as keyboards, IDE drives, IEEE parallel ports, serial communication ports. One example of such a Super I/O chip is the National Semiconductor PC87306 Super I/O chip. Thus, legacy devices can be included in the system by utilizing bridge 130, the ISA bus, and Super I/O chip 170.

SUMMARY

It has been discovered to combine a bridge function such as a PCI bridge with a Super I/O function. Further, it has been discovered to provide a first integrated circuit that includes super I/O functional logic to logically interface to legacy devices and a second integrated circuit that provides the input/output terminals for the super I/O functional logic to physically interface to legacy devices. Additionally, it has been discovered to partition a PC game port interface to legacy game devices into two portions interconnected by a serial bus. The first portion is on the first integrated circuit, and the second portion is on the second integrated circuit In one embodiment, an apparatus includes a game port interface and a bus. The game port interface includes first and second game port portions. The first game port portion is on a first integrated circuit and interfaces to an I/O bus. The second game port portion is on a second integrated circuit and provides I/O terminals to couple the game port interface to a peripheral device. The bus couples the first and second integrated circuits. The bus is for serially transferring game port information between the first and second game port portions.

In another embodiment, a method of controlling a game port is provided. The game port has first and second game port portions. The first game port portion is on a first integrated circuit, and the second game port portion is on a second integrated circuit. The first and second integrated circuits are coupled by a bus. The second integrated circuit has I/O terminals for coupling to at least one game device. The method includes sending a request for determining a position of the game device to the second game port portion over the bus, determining when a voltage level of an I/O terminal reaches a predetermined voltage level and generating done information indicative thereof, receiving on another I/O terminal state information indicating a state of a button on the game device, and sending the done information and the state information from the second game port portion to the first game port portion via the bus.

The invention also provides the advantage of avoiding problems associated with reduced supply voltages. As process geometries shrink, supply voltages drop, e.g., to 3.3 volts or less, leading to problems interconnecting to the various super I/O interface pins. The super I/O typically drives legacy devices having 5 volts I/O logic. The smaller geometries utilized for today's faster and denser integrated circuits can have problems interconnecting at that voltage. The invention provides for building the first integrated circuit with the smaller process geometries to provide a faster and denser chip. However, the second integrated circuit can be built with slower technologies, e.g., where the transistors have channel lengths of 0.5 microns or above. Thus, the problem of connecting 5 volts legacy interfaces to integrated circuits made with smaller process geometries is also reduced.

BRIEF DESCRIPTION OF THE DRAWINGS

The present invention may be better understood, and its numerous objects, features, and advantages made apparent to those skilled in the art by referencing the accompanying drawings, wherein the use of the same reference symbols in different drawing indicates similar or identical items.

FIG. 8*a* shows the frame transmitted from the South Bridge to the port expansion circuit on Data Out.

FIG. 8*b* shows the frame transmitted from the port expansion circuit to the South Bridge on Data In.

DESCRIPTION OF THE PREFERRED EMBODIMENT(S)

Figure 1:
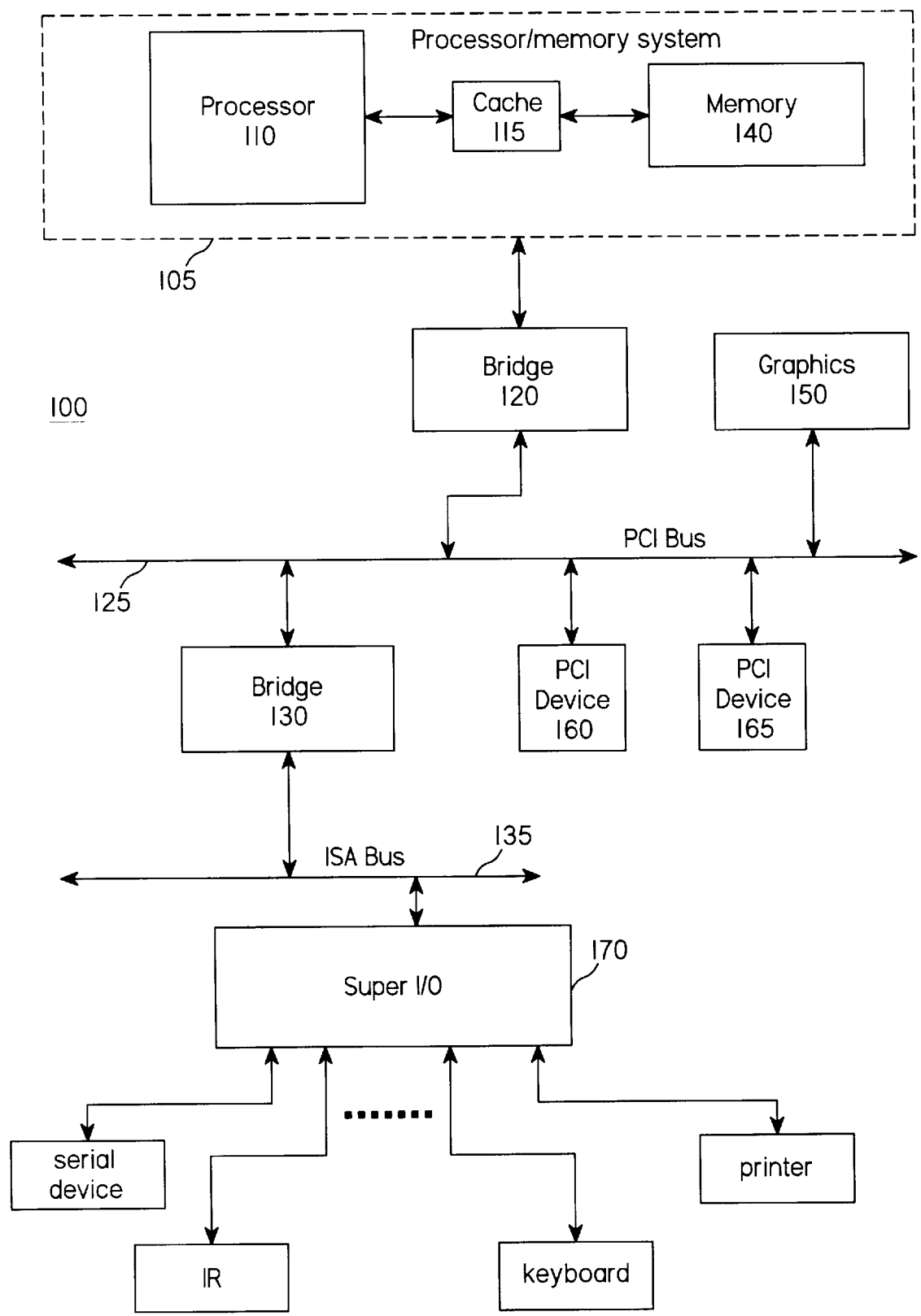
FIG. 1 shows a schematic block diagram of a prior art personal computer.
Figure 2:
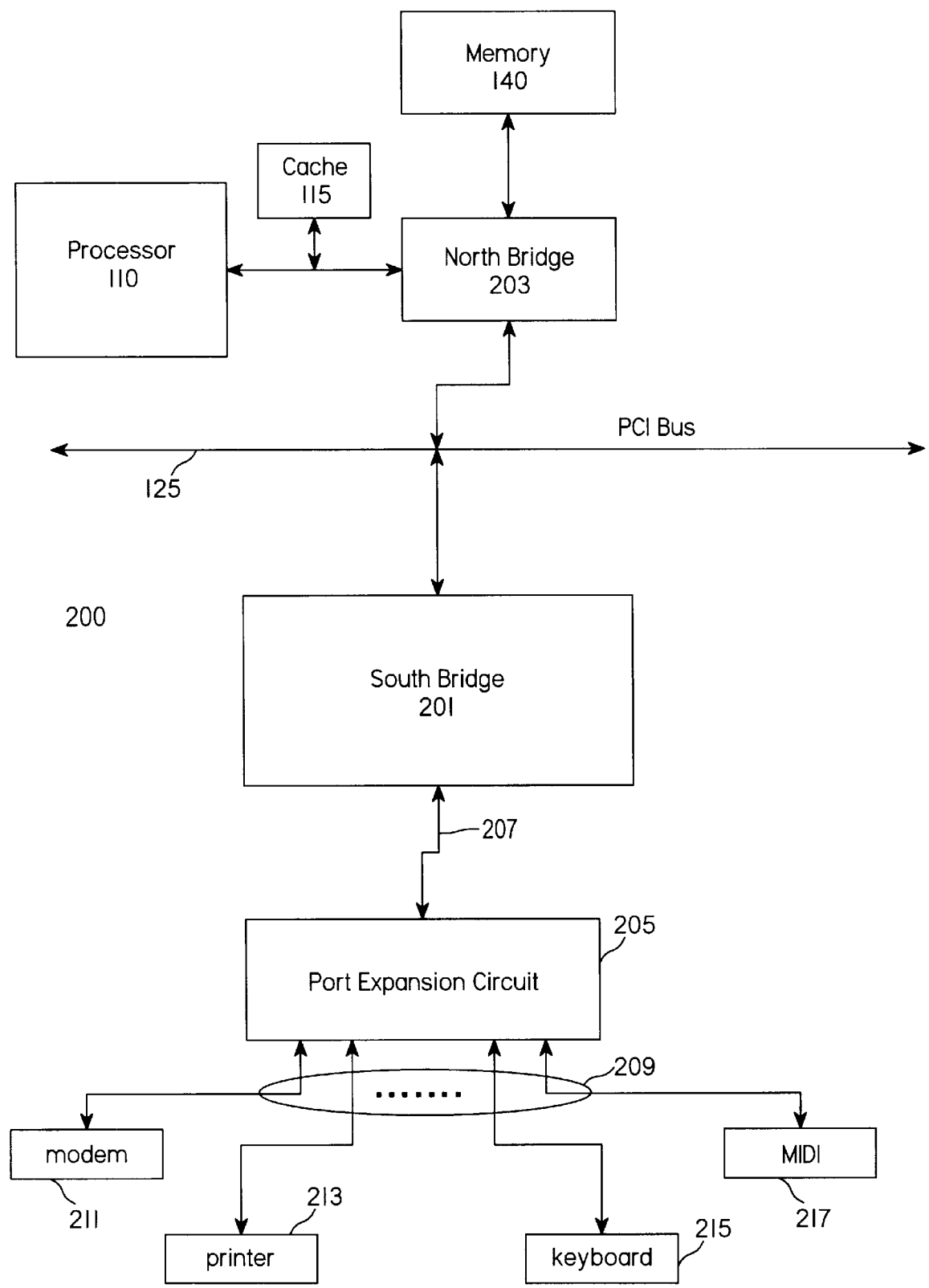
FIG. 2 shows a block diagram of a PC which includes a South Bridge circuit and port expansion circuit in accordance with the present invention.

FIG. 2 shows a computer system according to the present invention. Computer system 200 comprises processor 110 which is coupled to cache memory 115 and memory 140. Bridge circuit 203 North Bridge), provides an interface between the processor and memory and the PCI bus 125. Bridge circuit 201 (South Bridge) provides an interface between PCI bus 125 and a plurality of legacy devices. The bulk of the I/O pins that would normally be required to provide I/O for the South Bridge are provided instead on a separate circuit 205, connected to the South Bridge 201 via port expansion bus 207. The separate circuit 205 will be referred to herein as the port expansion circuit (PEC). The port expansion circuit provides I/O 209 to connect to the plurality of legacy devices such as a modem 211, a printer 213, a keyboard and/or mouse 215 or an electronic instrument 217 through a Musical Instrument Digital Interface (MIDI). The port expansion bus 207 connecting port expansion circuit 205 and South Bridge 201 operates to transfer signals that should be output to the legacy devices from the South Bridge to the port expansion circuit 205. The port expansion bus 207 also operates to transfer signals that are received from the legacy devices from the port expansion circuit to the to the South Bridge. In a preferred embodiment, both the South Bridge 201 and the port expansion circuit 205 are each separate integrated circuits.

Additional legacy devices are also supported by the South Bridge in combination with the port expansion circuit and will be described further herein. The South Bridge includes the logic necessary to interface the legacy devices to the rest of computer system 200 through the ISA bus. In addition to the I/O function, the port expansion circuit may incorporate additional logic functions as described further herein.

Figure 3:
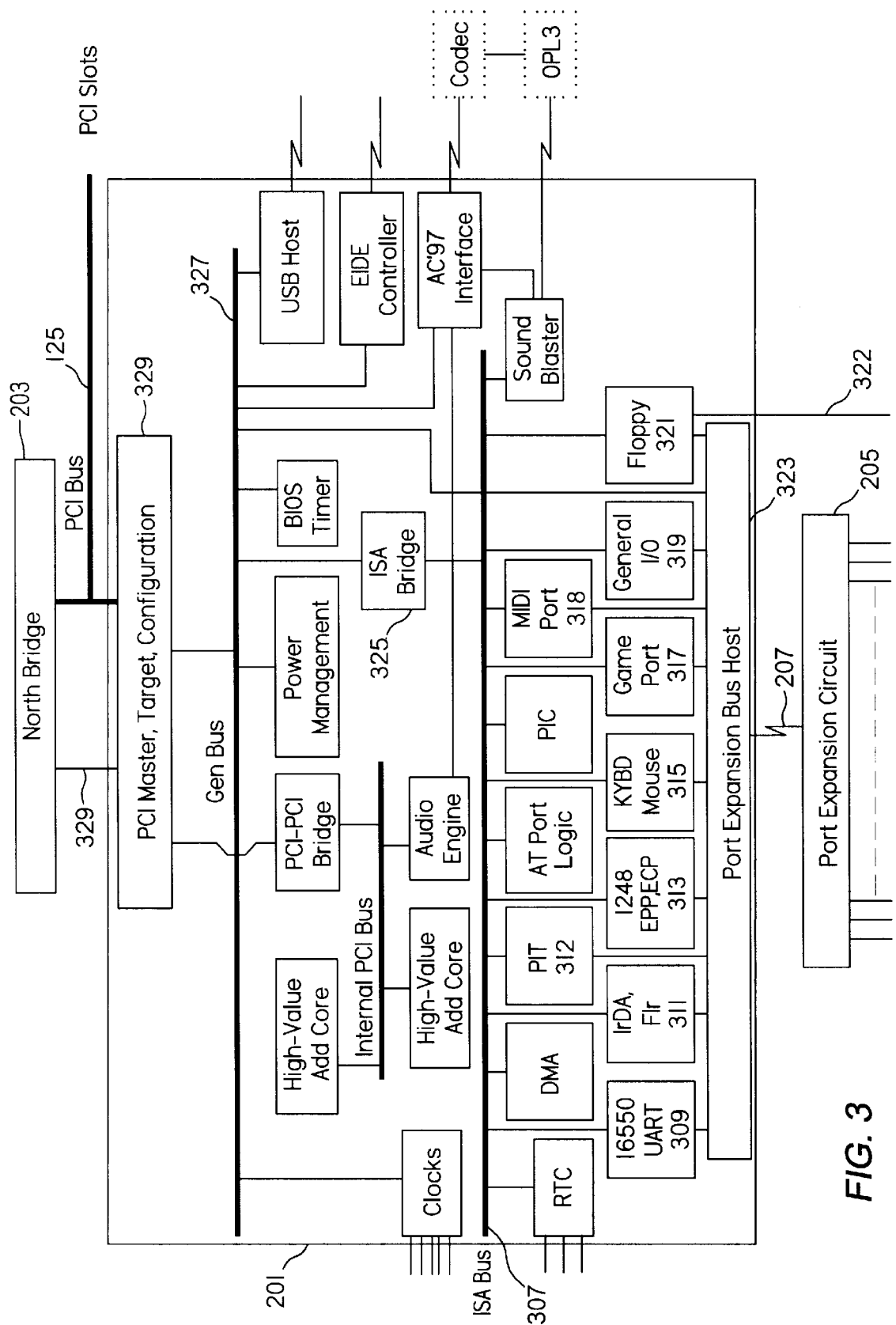
FIG. 3 shows a block diagram of the South Bridge circuit of the personal computer architecture of FIG. 2.

Referring now to FIG. 3, the South Bridge is shown in greater detail. Specifically, the South Bridge includes a number of logic blocks to support interfacing to the most commonly used legacy I/O devices. For instance, in a preferred embodiment, the South Bridge may include one or more universal asynchronous receiver transmitter(s) (UART) block 309, which for the embodiment shown is a 16550 UART, an infraed (IR) interface block 311 which may support both the Infrared Data Association (IrDA) standard and the Fast IR standard, Programmable Interval Timer (PIT) 312 which couples to a PC speaker on the port expansion circuit side, a parallel interface controller 313 for the IEEE 1248 parallel port, interface logic 315 for the keyboard and for the mouse, game port logic 317 for the game port, interface logic 318 for a MIDI port and General I/O 319 which is described further herein. A floppy controller 321 is also provided. Note that in some embodiments the floppy controller may include some input/output pins on the South Bridge and in other embodiments all the input/output pins are on the port expansion circuit. When the data separator is on the port expansion circuit, all the pins can be reflected onto the port expansion circuit and the I/O 322 coming off the South Bridge becomes unnecessary.

Those logic blocks to logically interface the legacy devices are coupled to ISA bus 307 which is internal to the South Bridge. Thus, in one preferred embodiment, the ISA bus has been incorporated into the South Bridge chip and the legacy devices are devices that interface to the ISA expansion bus (input/output bus) through the interface logic in the South Bridge. ISA bus 307 is coupled through ISA Bridge 325 to Gen Bus 327 which in the embodiment shown is a simplified PCI bus. In turn, Gen Bus 327 is coupled through interface block 329 to PCI bus 125. The South Bridge also includes sideband signals 329 which are coupled to the North Bridge. Such sideband signals provide for legacy signals such as interrupts which can not be handled over the PCI bus.

Each of the functional blocks 309–321 provide the logic necessary to interface signals from the ISA bus 307 to each of the devices coupled to the port expansion circuit. For example, block 309 which is a 16550 UART can be connected to a serial communications device such as a modem. Block 313 may be connected to a printer or other device on the parallel port. The floppy control block 321 is coupled to a floppy drive and the game port can be coupled to two joysticks. The keyboard and mouse control block 315 can be coupled to a keyboard and/or a mouse. The function of the control blocks 307–321 in the South Bridge to interface to the legacy devices is well known and the detailed functioning of that logic will not be further described except when needed for a better understanding of the claimed invention.

Providing I/O capability for all the legacy devices as well as performing the bus interface and other functions on the South Bridge would require an IC with more I/O capability and would therefore could be a more expensive part. It is preferable to build an IC which can be more inexpensively packaged in, e.g., quad flat packs and avoid more expensive packaging such as ball grid arrays which can provide higher pin density but can also be more costly to produce. In many instances, reducing pin count significantly can reduce the package cost of the product.

Separating the I/O function from the logic function provides further advantages. As discussed, as process geometries shrink for faster and denser integrated circuits, e.g. channel lengths of 0.35 microns and below, supply voltages drop, e.g., to 3.3. volts or less, leading to problems driving the various devices on the super I/O interface pins which are typically 5 volts. The super I/O interfaces tend to be 5 volts interfaces which is typical of the legacy devices. Since high speed is desired for the South Bridge IC, it is preferable to build the chip with the smaller process geometries to provide a faster and denser chip. However, the port expansion circuit chip can be built with slow technologies, e.g., where the transistors have channel lengths of 0.5 microns or above. That allows the port expansion circuit to be built with older and less expensive process technology and also allows the port expansion circuit to easily interconnect to the 5 volts interfaces typical of the legacy devices. At the same time, the more speed sensitive South Bridge can be built with the most up to date process technologies providing channel lengths for the transistors of the internal logic of, e.g., 0.35 microns, without the problem of interconnecting to a large number of 5 volts interfaces.

Therefore port expansion circuit 205 provides the I/O terminals for the functional blocks 309–321 for coupling the functional block 309–321 pins to the devices. That entails sending the output signals from the South Bridge to the port expansion circuit at a rate that is faster than the rate of change of the signals that are sent. Further, the input signals on the connectors of the port expansion circuit must be sent to the logic interfaces in the South Bridge for the particular device, such as a modem, at a rate faster than the rate of change of the signals from the particular device.

Each of the functional blocks 309–321 in the South Bridge are coupled to interface 323 also called the port expansion bus host. The port expansion bus host interface 323 is also coupled to Gen Bus 327 so that the CPU can read and write certain registers in the host interface as described further herein. Note that interface 323 may be coupled to ISA bus 307 instead of Gen Bus 327.

Bus 207, which will be referred to herein as the port expansion bus (PEB), couples interface 323 to the port expansion circuit 205. Port expansion bus 207 is utilized to transfer the states of the output signals from the functional blocks 309–321 to the output pins of the port expansion circuit. port expansion bus 207 is also used to transfer the states of the signals on the input pins of the port expansion circuit to the appropriate blocks in the South Bridge.

Figure 4:
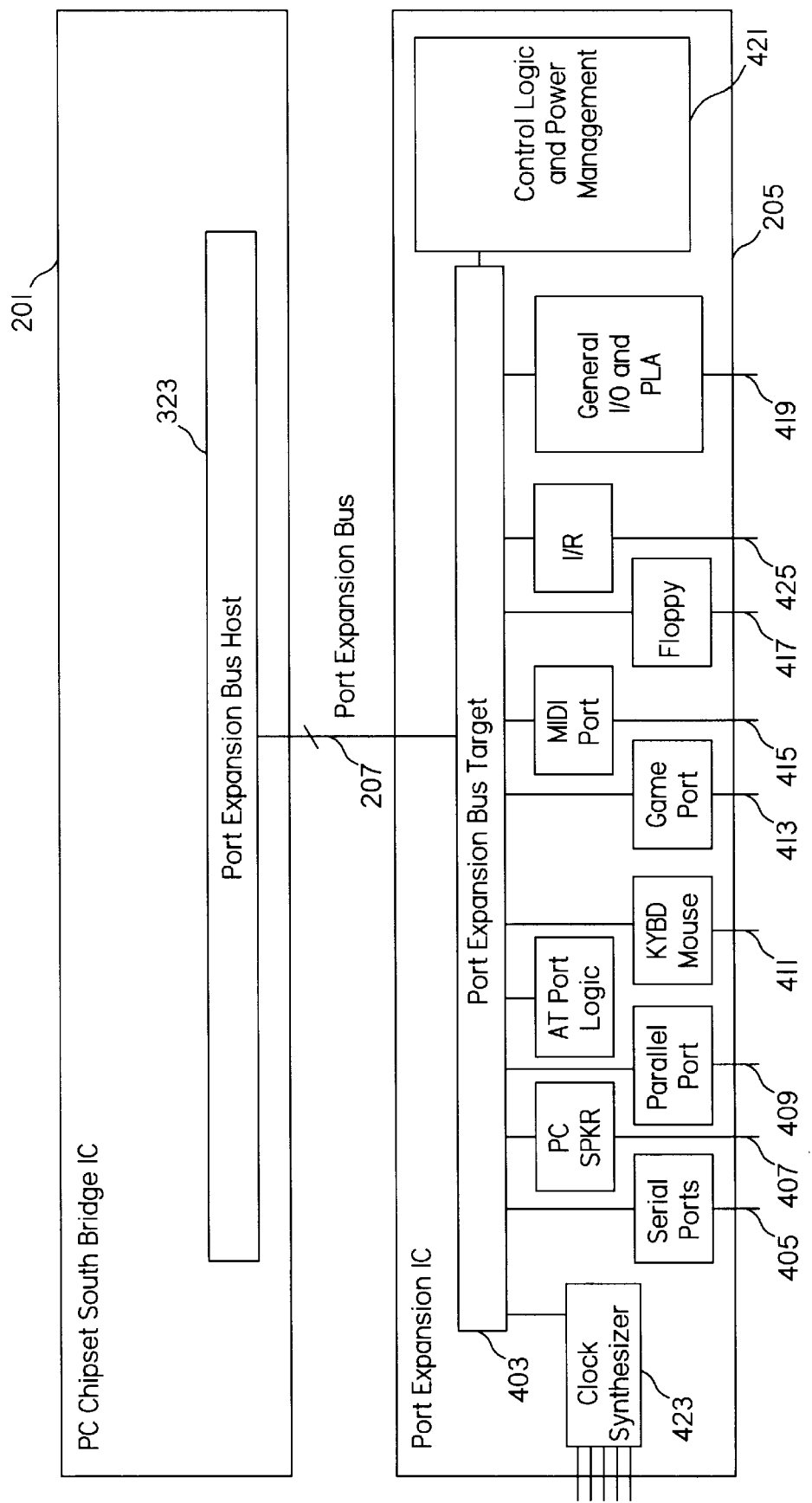
FIG. 4 shows a block diagram of a port expansion circuit (PEC) of the personal computer of FIG. 2.

The port expansion circuit 205 is shown in block diagram form in FIG. 4. The port expansion bus target interface 403 provides the interface to port expansion bus 207. Interface 403 provides signals from the South Bridge IC to the output pins for serial ports 405, PC speaker 407, parallel port 409, keyboard and mouse 411, game port logic 413, MIDI port 415, floppy 417, IR port 425 and General I/O 419. Control block 421 provides control function for interface 403. For example, control block 421 also provides a power management function which is discusses further herein. In addition, the control block decodes commands sent from the South Bridge and maintains status information which can be provided to the South Bridge as discussed further herein.

Clock synthesizer 423 provides the multiple clocks which are required by the PC system. The clock synthesizer is also discussed further herein.

In order for the Port Expansion Circuit 205 to provide I/O function for the South Bridge IC, the output signals from the interface logic blocks in the South Bridge IC have to be reflected onto the output pins of the port expansion circuit. Therefore, the output signals have to be sampled in the South Bridge and provided to the output pins of the port expansion circuit at a rate faster than the output signals change. Additionally, the input signals on the input pins of the port expansion circuit have to be sampled and provided to the interface logic blocks in the South Bridge IC at a rate faster than the input signals change. In one exemplary embodiment, a protocol-free six wire bus running at about 50 MHz provides the necessary bandwidth to allow the port expansion circuit to provide I/O for the various interface logic blocks in the South Bridge. Utilizing such an approach can reduce the South Bridge pin count by approximately 70 or more pins. Such savings in pin count generally leads to a less costly chip.

The bus comes in several preferred embodiments. In a first embodiment, which is intended to provide pin reflection capability for slower devices, the bus is a basic four-pin serial bus shown in FIG. 5. A second embodiment of the bus is provided in order to support higher speed ports, e.g., to provide the necessary bandwidth for the higher speed parallel port. In some circumstances, only the first embodiment may be necessary, if for instance, the parallel port is not utilized or is connected to the South Bridge rather than the port expansion circuit, or if the speed of the port expansion bus is increased significantly.

Figure 5:
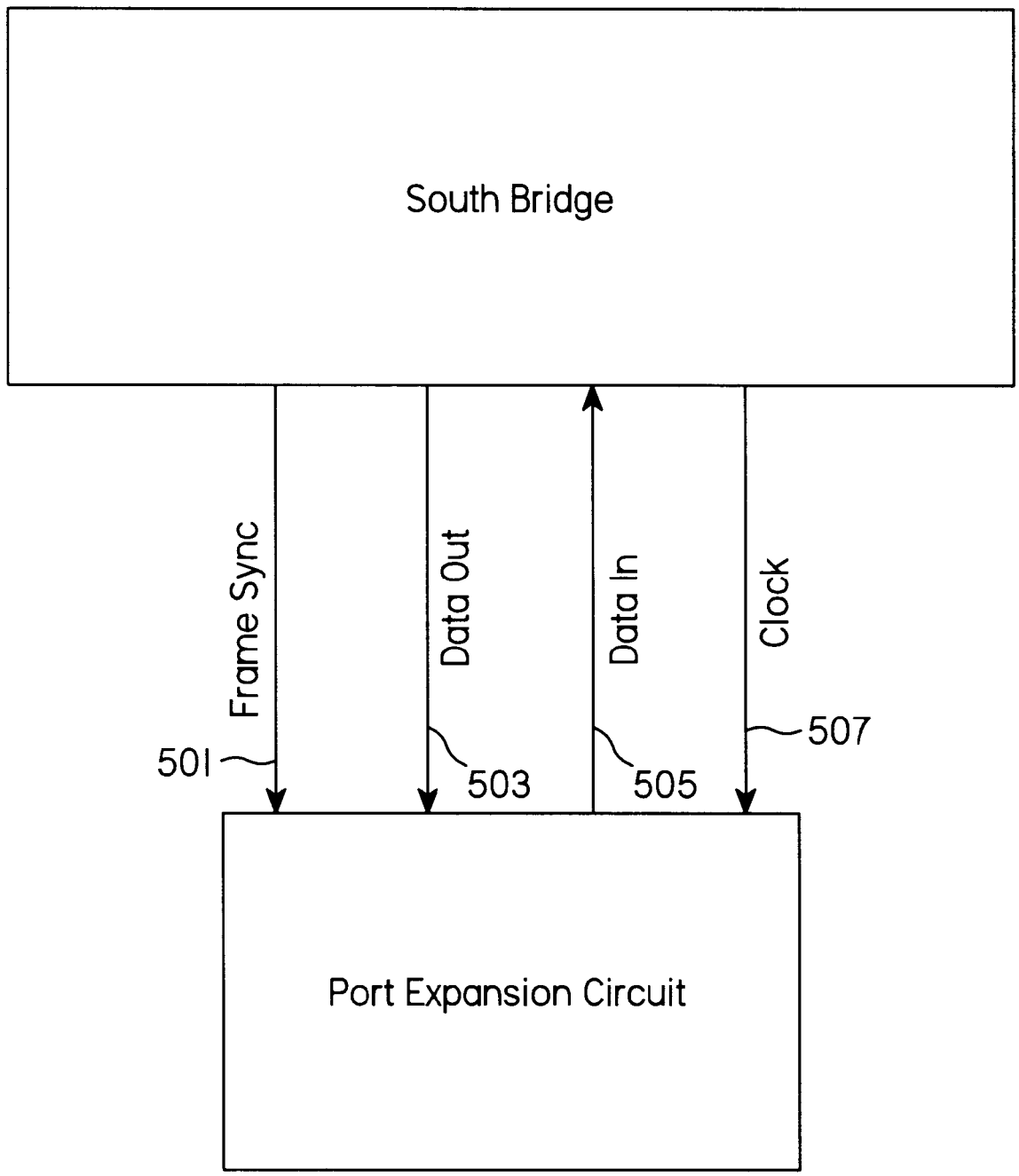
FIG. 5 shows a four line embodiment of the bus connecting the South Bridge and the port expansion circuit of the personal computer of FIG. 2.

Referring now to FIG. 5, the first embodiment of the bus includes a frame sync 501, a synchronous data clock 507, a Data In line 505 (data from the port expansion circuit to the South Bridge), and a Data Out line 507 (from the South Bridge to the port expansion circuit). In one exemplary embodiment, the nominal clock rate is 50 MHz and a frame is chosen to contain 96 bits. Other frame lengths and clock rates are of course possible. For example, in another embodiment, the clock rate is 33 MHz and data is clocked on both rising and falling edges of the clock signal.

Figure 6:
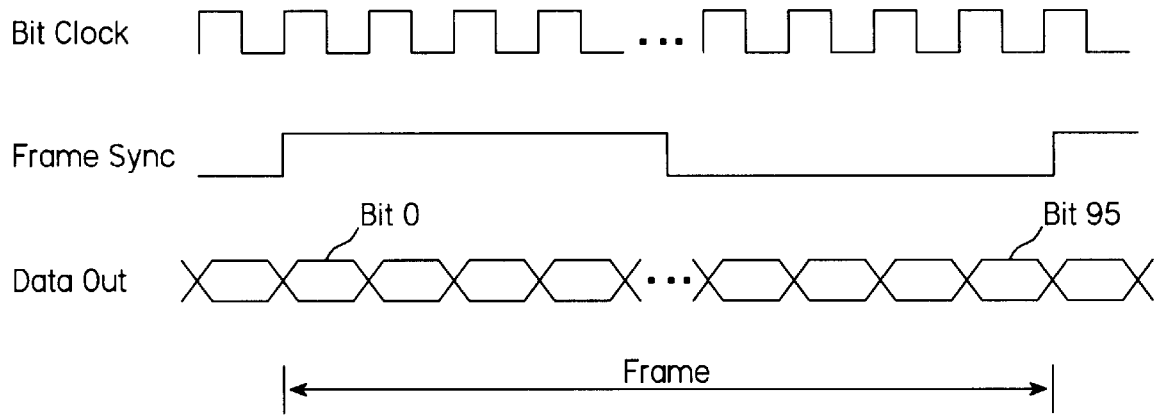
FIG. 6 is a timing diagram for the port expansion bus (PEB).
Figure 7:
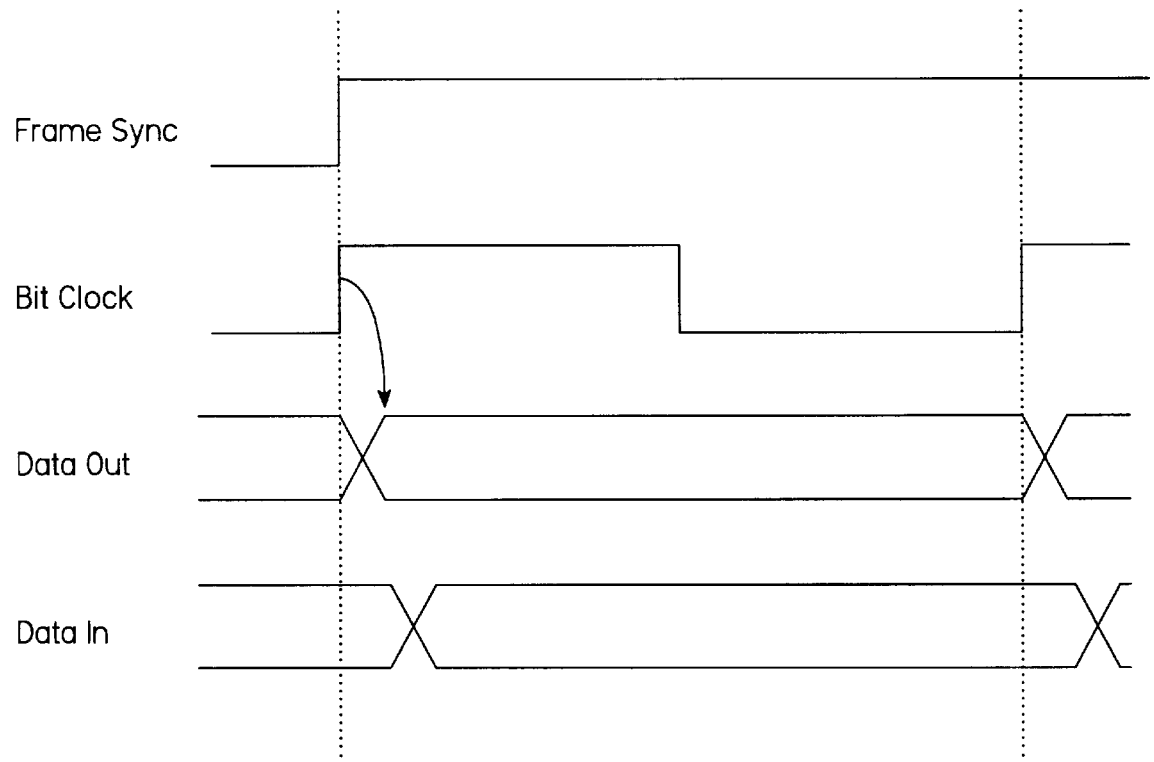
FIG. 7 is a timing diagram showing the relation between the frame sync signal, the bit clock, Data In and Data Out on the port expansion bus.

Referring to FIG. 6, the beginning of each frame is determined by assertion of the frame sync signal. The frame sync signal is preferably a 50% duty cycle signal to facilitate counting frame bits. Other duty cycles are of course possible. One frame consists of 96 clock periods. Referring to FIG. 7, one data bit is provided on the Data Out and Data In line each clock period during each frame. The data bits are provided relative to the rising edge of the bit clock in the embodiment shown. With a frame of 96 bits, the frame rate is nominally 500 kHz. Each bit in each frame that represents an I/O bit is sampled and provided from/to the appropriate I/O pin of the port expansion circuit approximately every 2 microseconds. That speed is sufficiently high to support most of the legacy devices supported by the port expansion circuit.

In order to help ensure that the interfaces to the legacy devices operate correctly, i.e., that the I/O signals are adequately reflected, in a preferred embodiment, the bus is "protocol free," in that there are no activation sequences or complex state machines required. The bus is simply a 96-bit time-slot structure where each bit time is assigned a specific function. FIGS. 8*a* and 8*b* show the non-parallel port bit time slot assignments to and from the port expansion circuit. All bits in FIGS. 8*a* and 8*b* are numbered with respect to the leading edge of frame sync. In addition to being "protocol free", the bus operates to continuously transfer frames between the port expansion circuit and the South Bridge. The frames are contiguous in that there is no time between each frame, i.e., the start of bit 0 is one clock period from the start of bit 95. However, other embodiments may provide some time periods between frames so long as the port expansion bus stays substantially continuously running to sufficiently satisfy the speed requirements of the pin reflection approach described herein. The I/O pin values are transferred every 2 microseconds whether they change or not. However, the bus does not operate while the port expansion circuit and South Bridge are in a power down mode to reduce power consumption.

Referring again to FIGS. 8*a* and 8*b*, the frame includes provision (Link Command/Status) for transmitting commands to the port expansion circuit and receiving back status from the port expansion circuit. Commands are transmitted from the South Bridge to the port expansion circuit via the first nine bits of the frame. Bit 0 is a flag that, when set, indicates that the command field is valid and therefore a new command is being transmitted. Bits (1:8) contain the command byte; thus, there are 256 possible commands. The individual commands can be, for example, requests for the port expansion circuit to take some action (such as entering a power management state) or a request to read a register within the port expansion circuit.

Figure 9A:
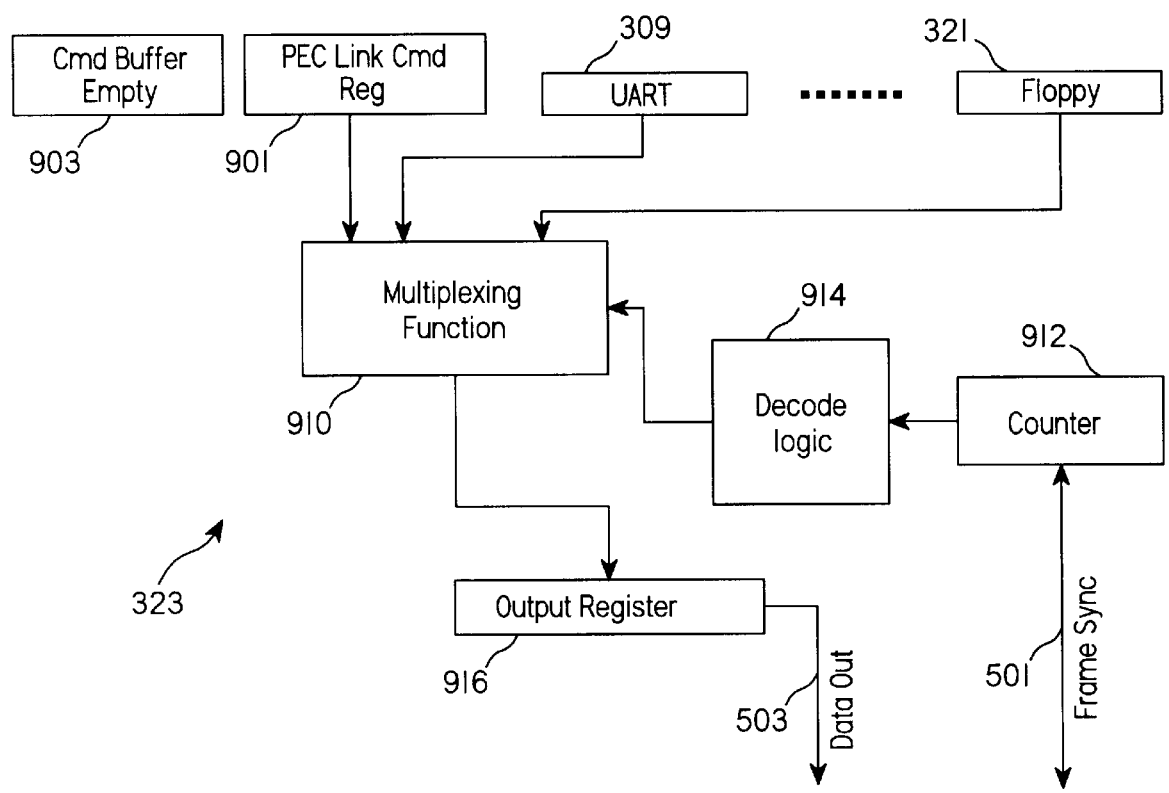
FIG. 9*a* is a schematic block diagram of the port expansion bus host interface in the South Bridge.

Commands are sent only once. That is, the Valid bit (bit 0) is only active for a single frame. Commands are transmitted during the next frame following a CPU write to the port expansion circuit Link Command Register 901 which is located in the host interface in the South Bridge as shown in FIG. 9*a*. There is no provision for buffering up commands. A Command Buffer Empty status bit 903 is provided in the South Bridge indicating that a new command can be sent.

When the Valid bit (bit 0) is inactive, the link command bits 0–7 may be used to transfer other information such as static command information. Such static command information may include a "keep alive" field which informs the port expansion circuit that the South Bridge is still present.

In the receive frame received from the port expansion circuit, the bits corresponding to the link command bits in the transmit frame are link status bits (bits 1:8). The status field has two modes. First, the status field presents static status information, i.e., the eight bits reflect the current status of the port expansion circuit. The static status field my include such information as the mode of the parallel port, the mode in which other ports are operating, the power mode of the port expansion circuit and any diagnostic information available. Secondly, the status field can be used to return read data requested by a specific command sent from the South Bridge, i.e., a command sent from the South Bridge in the Link Command field requesting that specific data, such as a the contents of a register, be returned. The Response/Status bit (bit 0) indicates in which mode the link status field is operating during that frame.

Figure 9B:
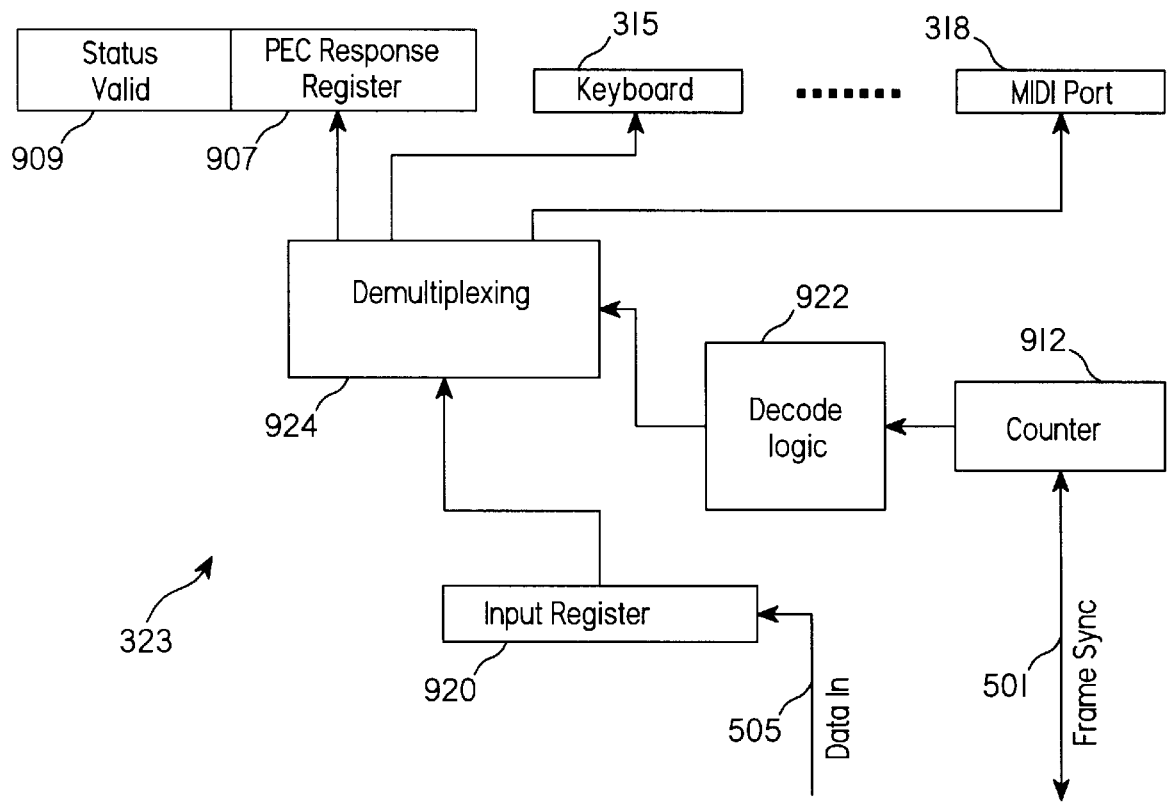
FIG. 9*b* is a schematic block diagram of the receive logic of the port expansion bus host interface in the South Bridge.

When the Response/Status bit is active, the data field (bits 1:8) contains the response to a request received in the immediately preceding frame. Responses are only sent for a single frame time. Referring to FIG. 9*b*, there is only a single byte buffer 907 (the port expansion circuit Response Register) for received responses located in the South Bridge.. User software should not transmit additional response requests until it has read the data from the port expansion circuit Response Register. A status valid bit 909 is provided indicating the availability of valid data in the port expansion circuit Response Register for the CPU. The bit is cleared when the port expansion circuit Response Register is read. Static status information is transmitted during all frames where the Response/Status bit is non asserted.

With the exception of the link command/status field, printer port data fields, game port X and Y comparators, and reserved bits, all bit positions in the frame are "reflected pins." In essence, the state of a signal on the transmitting side of the link is reflected to a signal on the other side. The state of each bit is updated each frame time (nominally every 2 microseconds). In this way, the states of relatively slow changing signals can be transmitted over a time-division serial bus and recreated on the other side. The state of input pins on the port expansion circuit are sent to the South Bridge via the Data In pin. The state of output pins on the port expansion circuit are sent from the South Bridge via the Data Out pin.

Referring again to FIGS. 9a and 9b, the port expansion bus host interface 323 in the South Bridge is shown in greater detail. The various bits located at the outputs of the logic interface blocks 309–321 are provided to multiplexing logic block 910. The correct bit is selected for output onto Data Out line 503 at the right time slot based on the value in the counter 912. A decode of the counter value is used in decode logic 914 to select the appropriate bit to output at the particular time slot. In one embodiment, output register 916 may be implemented as a serial shift register, that is loaded up every 8 clocks with new data to be shifted out.

FIG. 9b shows additional details on the receive side of the host interface 323. Data In is received on the Data In line 505 from the port expansion circuit and placed in the input register 920. In some implementations, register 920 may be a single bit and in other implementations, it may be a serial shift register which buffers, e.g., a byte of date before the data is provided to the appropriate logic interfaces. The decode logic 922 which directs the input data through logic 924 to the appropriate ports, e.g. ports 315–318, may have significant overlap with decode logic 914 shown in FIG. 9a. When a bit is received, it is transmitted to the appropriate interface and clocked into the input port of that interface. That function may be accomplished by enabling a clock to that input latch when the time slot for that bit has been received.

Figure 10:
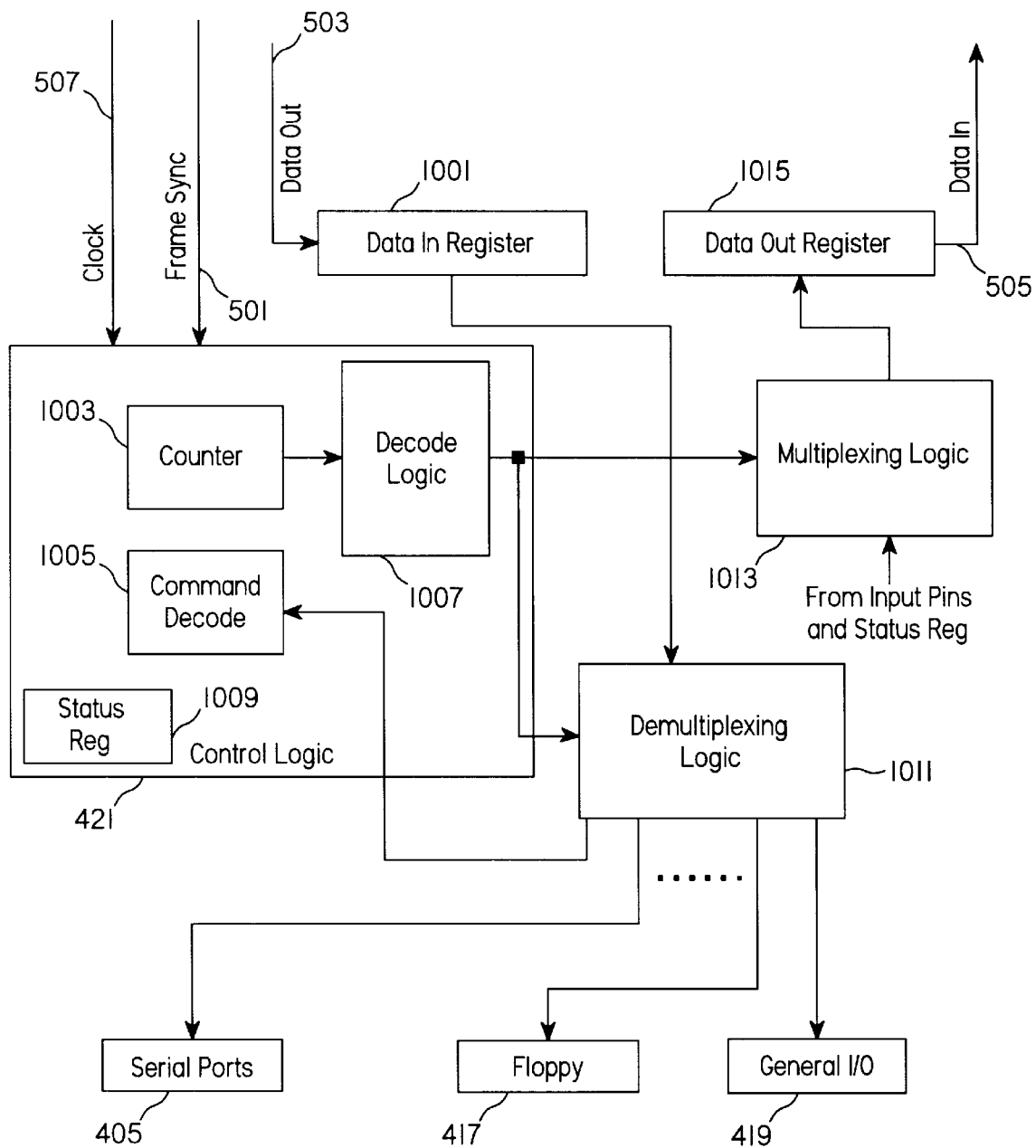
FIG. 10 is a schematic block diagram showing further details of the port expansion circuit.

FIG. 10 shows additional details of the port expansion circuit. Data is received on Data Out line 503 from the South Bridge. It is received into a data register 1001 and sent to the appropriate I/O port 405 through 419 based on the counter value in counter 1003 and decode logic 1007 and logic 1011. Logic 1011 may provide a clock to the appropriate output port at the appropriate bit time. The control logic 421 includes the command decode logic 1005 to decode commands sent from the South Bridge as well as status register 1009. Data bits received from the I/O ports are assigned to their correct bit times in each frame by multiplexing logic 1013 and provided to the data out register 1015 at the appropriate bit time.

An example of pin reflection according to the invention is as follows. The PC Speaker is connected to the counter-timer block 312 in the South Bridge and the frequency of the speaker is determined by the frequency of the digital signal output by the counter timer block 312 which is an 8253 or 8254-2 equivalent timer/counter. At the start of bit time 82 of each frame, the state of the counter timer's PC Speaker output is sampled. Bit position 82 in the frame transmitted to the port expansion circuit is updated to reflect the sampled state. At the port expansion circuit end, the state of the Data Out pin is latched during bit time 82. The PC Speaker pin on the port expansion circuit always reflects the latched value. Thus, the PC Speaker pin always reflects the state of the counter timer output, with a delay of up to 2 microseconds.

Functions within a personal computer system that utilize pin reflection include and can be supported by the 4 pin bus described herein include the PC Speaker, MIDI Port, Keyboard, Mouse, Serial Ports and General I/O. The Parallel Port and the Game Port and the Floppy port may not use pin reflection for all functions.

The transmit frame shown in FIG. 8a includes bits 32:42 for the floppy disk drive. Serial port 0 and serial port 1 are provided in bits 48:50 and 53:55, respectively. Bits 54 to 57 may also be used for an infrared port such as the Infrared Data Association (IrDA) port. Bits 65:68 are utilized for the game port. Bit 82 provides the PC speaker out. Bit 83 is a MIDI transmit (TX) bit. Bits 84–95 are user defined bits. The remaining bits are reserved for future use.

The receive frame is shown in FIG. 8b includes bits 32:35 as inputs from the floppy drive. Bits 48:57 are serial port 0 and serial port 1 bits. Bits 54:57 may be utilized for an IrDA port or a mouse as indicated. Bits 65:72 are utilized for the game port inputs. Bit 83 is a MIDI receive (RX) bit. As shown bits 84–95 are examples of what might constitute general I/O bits. For example, bit 84, Vol+, bit 85 Vol– and bit 86, mute, could be used to control speakers that are resident in a terminal. Bit 87 can be used as a key lock indicator indicating the status of the lock on the front of the computer. The turbo bit can indicate if the PC is in turbo mode. Setup disable can indicate the user of the PC is prevented from going into a setup mode. CLR CMOS is used to clear battery backup memory containing basic system configuration such as what drives are installed and how much memory is available. Bits 91–94 could be used to indicate the status of dip switches on the board. Bit 95 is a general I/O bit. The remaining bits in the frame are reserved for future use.

Computer system 200 includes a game port to provide an interface to at least one peripheral device, usually a game device. Typically, the game port provides an interface to two game devices. Game devices coupled to the game port of computer system 200 typically include various movable elements to provide a means for a computer system user to provide input information to computer system 200. For example, a game device that is most commonly coupled to the game port is a joystick device having a joystick and two buttons. A two-state movable element such as a button is used to represent two distinct states such as on and off, or open and closed, etc. A positional movable element such as a joystick is typically used to represent position or movement information which varies over a range of values. Typically, a circuit element in each game device has a variable characteristic that is proportional to the movement of each positional movable element. The variable characteristic or a characteristic proportional thereto is detectable by the game port and the processor of computer system 200.

Figure 11:
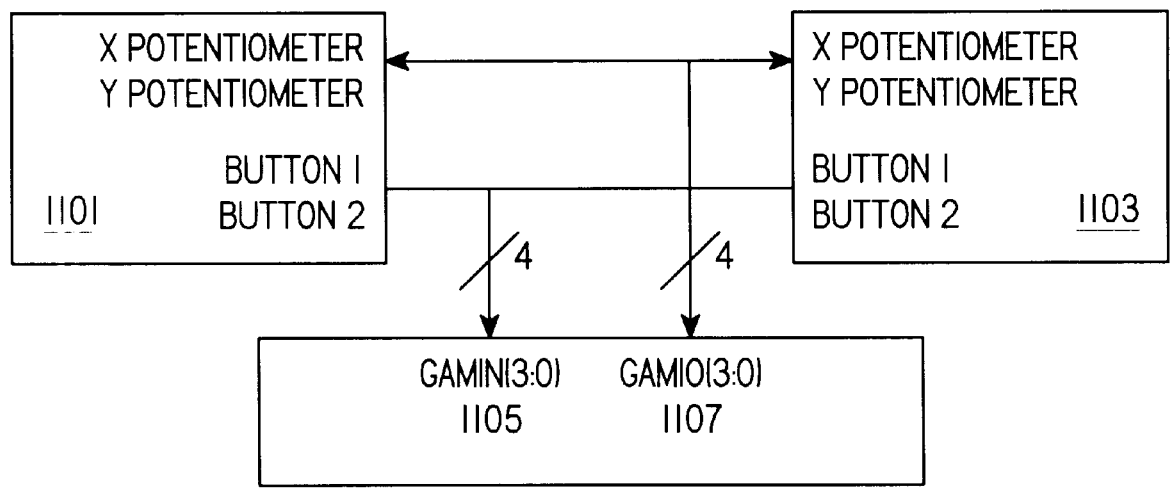
FIG. 11 shows a game port configuration which includes two joysticks.

Referring to FIG. 11, the game port of computer system 200 supports connection of two such joystick devices 1101 joystick device A) and 1103 joystick device B). Each joystick of the joystick devices is movable in two different axes which are referenced as the X-axis and the Y-axis. Each joystick device contains a potentiometer for each of the X and Y directions of movement. The resistance of each potentiometer is proportional to the position of the corresponding joystick in the corresponding axis of motion.

Joystick position information is provided to port expansion circuit 205 via GAMIO lines 1105 of I/O 209. Button state information is provided over the GAMIN lines 1107. The buttons of the joysticks are open until pressed by a user. The four GAMIN pins are internally pulled up through a 6K ohms (nominal; plus or minus 2K ohms) resistor in the port expansion circuit or in the internal circuitry of the joystick devices.

Figure 12:
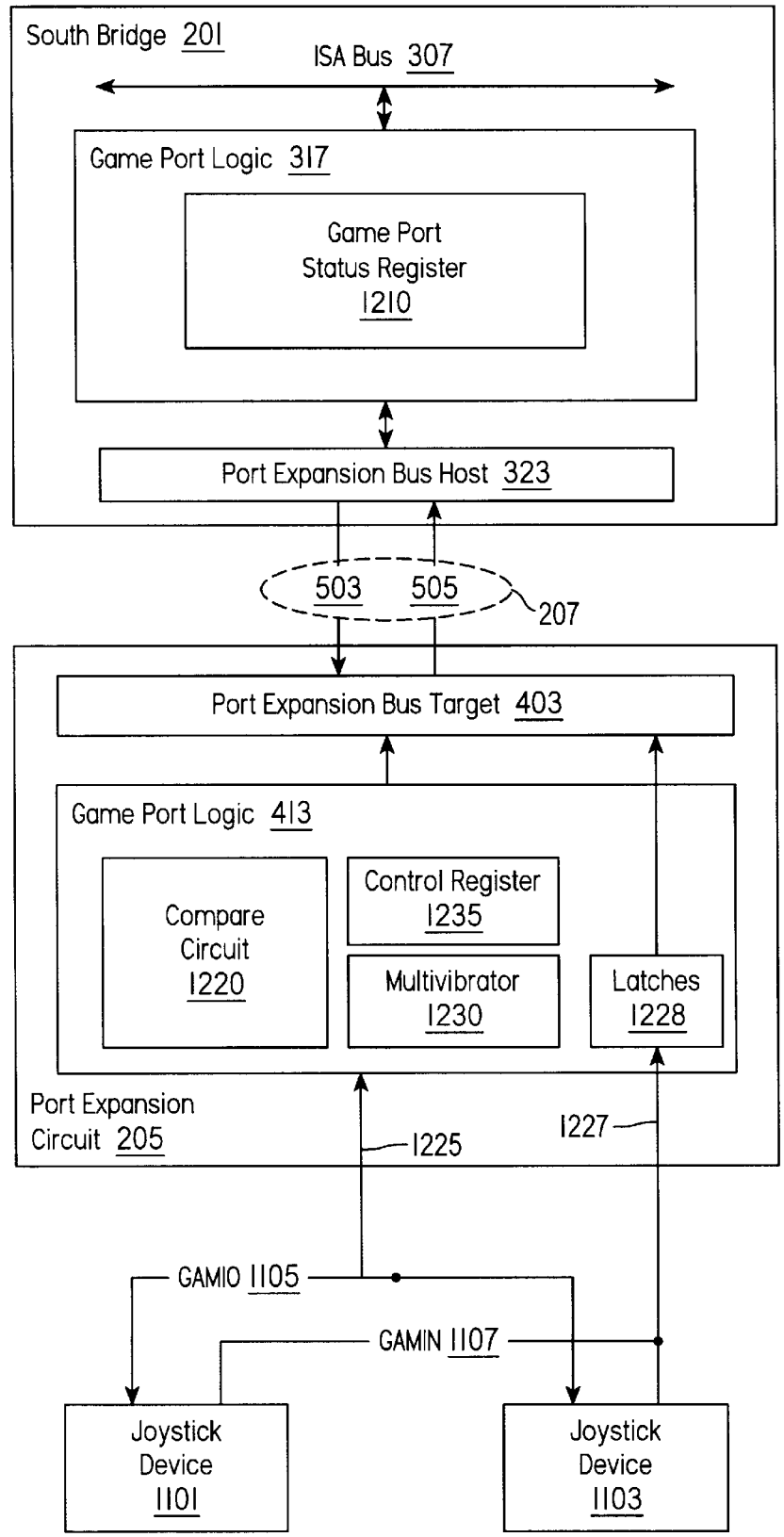
FIG. 12 is a schematic block diagram showing further details of the game port interface circuit.

Referring to FIG. 12, the game port includes game port logic 317 on South Bridge 201 and game port logic 413 on port expansion circuit 205. Game port logic 317 is coupled to game port logic 413 via bus 207. Port expansion bus host 323 and port expansion bus target 403 are provided to facilitate transference of the proper information at the proper time over bus 207 as discussed above. Bus 207 includes data out line 503 and data in line 505 for transferring information regarding the status of joystick devices 1101, 1103. Game port logic 317 includes game port status register 1210 for storing the status information of joystick devices 1101, 1103. Game port logic 413 includes compare circuit 1220, control register 1235 and multivibrator 1230, the finctionality of which are described below.

The game port includes four pins which are reflected over bus 207. The reflected pins convey information regarding the status of I/O terminals 1227 at GAMIN 1107 to game port logic 317. I/O terminals 1227 receive information regarding the status of the joystick device buttons and provide the information to latches 1228. The reflected pins are continuously (e.g., every 2 microseconds) updated via data in line 505 from latches 1228 of port expansion circuit 205 to game port logic 317. The values of the pins are stored in game port status register 1210. Software configures computer system 200 to access the game port status register 1210 to determine the state of each of the buttons.

The game port also includes four pairs of non-reflected pins. During each frame of bus 207, four request bits of game port status register 1210 are transferred to game port logic 413 over data out line 503. These four request bits, when asserted, direct game port logic 413 to perform a function (e.g., "read" a joystick position of joystick devices 1101 and 1103). Also, during each frame of bus 207, four bits representing the status of I/O terminals 1225 are transferred to game port logic 317 over data in line 505. These four input bits represent associated information indicating that a corresponding function has been completed by game port logic 413 (e.g., the joystick position reads are done). Because two joystick devices may be connected to the game port interface, and because each joystick has two axes of motion, four positions of joysticks can be referenced by the four non-reflected pairs of pins. Software configures computer system 200 to access the game port to determine the X and Y position of each of the joysticks.

Game port logic 317 includes game port status register 1210 for storing the status information of joystick devices 1101 and 1103. Game port status register 1210 receives and stores four bits showing the button states of the joystick devices and four bits showing the status of joystick-position checks performed by game port logic 413. Game port status register 1210 stores a byte with a higher order nibble indicating the status of the buttons and a lower order nibble indicating the status of the joystick-position checks. As mentioned, the four reflected pins of the game port automatically convey the status of the four joystick device buttons to game port status register 1210. Thus, game port status register 1220 is continuously updated via bus 207 with the latest (within 2 microseconds) status of the buttons. An exemplary game port status register 1210 is shown in Table 1.

TABLE 1

Game Port Status Register 1210

| BB2 | BB1 | BA2 | BA1 | BY | BX | AY | AX |
| --- | --- | --- | --- | --- | --- | --- | --- |

Table 1 shows an 8-bit register for storing status information for two joystick devices (joystick device A and joystick device B). The first two bits BB2 and BB1 show the status of buttons 2 and 1 of joystick device B. The next two bits BA2 and BA1 show the status of buttons 2 and 1 of joystick device A. The next two bits BY and BX show the status of a check on the position of the joystick of joystick device B. The last two bits AY and AX show the status of a check on the position of the joystick of joystick device A.

The status of the buttons is readable by computer system 200 with an IN instruction referring to legacy address 201h. For example, an exemplary set of software instructions could investigate the status of button 2 of joystick A (BA2) by loading the game port address (201h) into the D register (dx), reading the game port status register 1220 (referenced by the address in dx) into the A register (ax), and checking to see whether the BA2 bit is set (TEST al, 20h).

Figure 13:
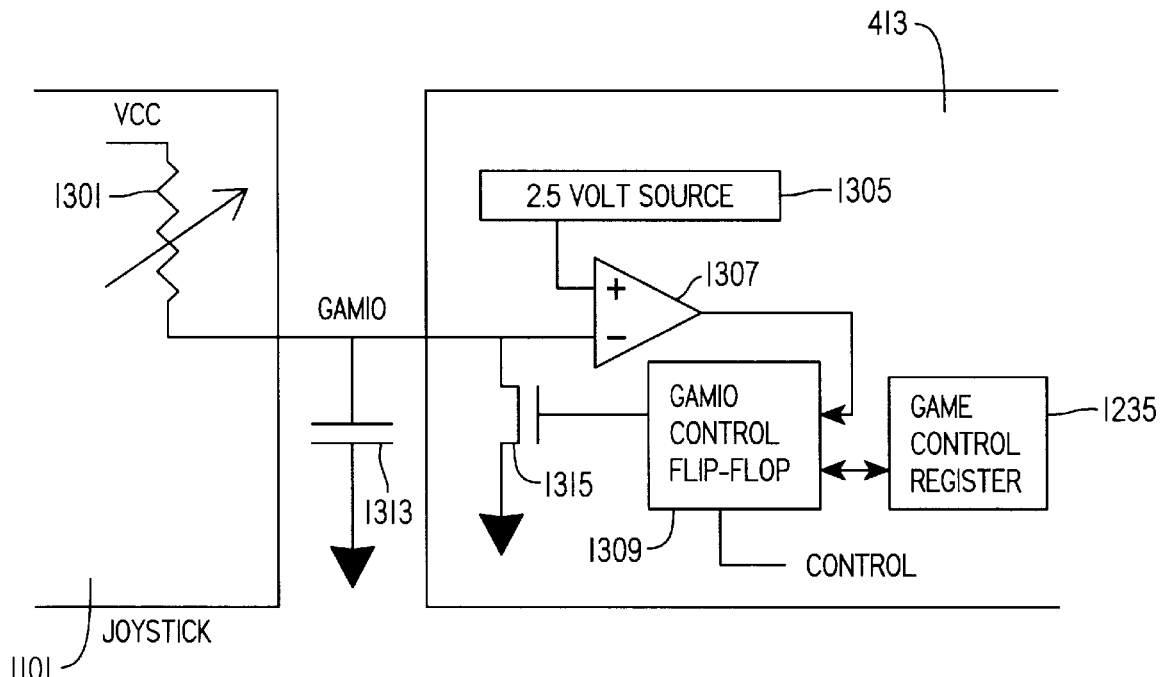
FIG. 13 is a schematic block diagram of a circuit that determines the X or Y position of a joystick.

Checking the position of the joysticks is more readily understood in reference to FIGS. 12 and 13. Referring to FIG. 12, game port logic 413 includes compare circuit 1220, control register 1235 and multivibrator 1230. I/O terminals 1225 connect game port logic 413 to GAMIO 1105. Referring to FIG. 13, compare circuit 1220 includes voltage source 1305, comparator 1307, and switch 1315. Because of their analog nature, the comparators are preferably located in port expansion circuit 205. Switch 1315 is a transistor. Multivibrator 1230 is a flip-flop (GAMIO control flip-flop 1309). Game port control register 1235 is coupled to GAMIO control flip-flop 1309. Game port logic 413 is coupled to joystick device 1101 via GAMIO 1105. Joystick device 1101 includes potentiometer 1301 coupled to a voltage supply Vcc. The resistance of potentiometer 1301 is determined by the position of the joystick of joystick device 1101. The external potentiometers used in joystick devices normally range from 2.2K to about 100K ohms. Potentiometer 1301 and capacitor 1313 provide an RC circuit. External capacitor 1313 is normally 5600 picofarads (pF). The control line coupled to flip-flop 1309 ensures that when the position of the joystick is not being requested, switch 1315 is turned off, capacitor 1313 is charged and GAMIO line 1105 is not drawing current from Vcc.

Although multivibrator 1230 is bistable (i.e., a flip-flop) in the embodiment of FIG. 12, such is not required. For example, a monostable "one-shot" multivibrator could be used as long as the length of time the multivibrator remains in the unstable state is greater than the longest time required for charging the RC circuit (i.e., potentiometer 1301 and capacitor 1313). In this case, a control line for resetting the multivibrator is not required.

Generally, software writes to the game port (ISA legacy address 201h) requesting that the joystick positions be measured by setting a bit in game port status register 1210. Software also determines and stores the time of the request by accessing a counter or a timer. Game port logic 413 measures a circuit characteristic of the joystick devices responsive to the bit being set, and resets the corresponding bit in the game port status register 1210. Software periodically polls game port status register 1210 to determine if the corresponding bit has been reset. When the bit is reset by game port logic 413, software again determines and stores the time. Next, software determines the time interval between the two time checks. Because the time for the game port logic 413 to perform the function of measuring the circuit characteristic is proportional to the characteristic to be measured, and because the characteristic is proportional to the position of the joystick in question, the position of the joystick can determined from the length of the time interval.

When one of the four lower order bits of game port status register 1210 is set by software, a request is sent to game port logic 413 from game port logic 317 via bus 207 bits 65:68 as shown in FIG. 8a. Specifically, the lower four status bits are transferred via bus 207 at frame bits 65:68 to game port logic 413. Thus, a change from a non-request value to a request value is automatically updated to game port logic 413. Responsive to receiving the request, game port logic 413 charges the RC circuit for each joystick axis. More specifically, responsive to receiving the request value of the corresponding status bit, GAMIO control flip-flop turns off transistor 1315, thereby tristating (forcing to high-impedance) I/O terminal 1225 and allowing capacitor 1313 to charge. When each capacitor 1313 is charged to a predetermined voltage set by each voltage source 1305 (e.g., 2.5V), the corresponding done bit(s) are set. The GAMIO control flip-flop 1309 turns on transistor 1315 so that transistor 1315 is conducting, thereby discharging capacitor 1313. The done bits are automatically transferred from game port logic 413 to game port logic 317 via bus 207 where the corresponding status bits are set to a non-request value. The done bits are latched to bus 207 for transmission in the proper time slot.

The high-impedance time for the pin can be calculated by the following formula:

$$\text{time} = -RC \ln(1-(V_{th}/V_{cc}))$$

where Vth is the threshold voltage of 2.5 volts of voltage source 1305, Vcc is the pull-up voltage to potentiometer 1301 (5.0 or 3.3 volts), R is the resistance of potentiometer 1301, and C is the capacitance of capacitor 1313. If Vcc is 5 volts, then the time will vary from about 8 to 388 microseconds. If Vcc is 3.3 volts, then the time will vary from about 20 to 1000 microseconds.

At the South Bridge side, the corresponding bits in the game port status register 1210 are updated upon the transition of the respective done bits (bits 65:68) in the frame received from port expansion circuit 205. Software polls the game port continuously checking for toggled GAMIO bits BY, BX, AY and AX to determine the time required to charge each external capacitor through the X and Y potentiometers in each joystick. Thus, the position of the joystick determines the resistance of potentiometer 1301 which determines the high-impedance time for the I/O terminal 1225. The high-impedance time of each I/O terminal 1225 is used by computer system 200 software to model each joystick position.

Figure 14:
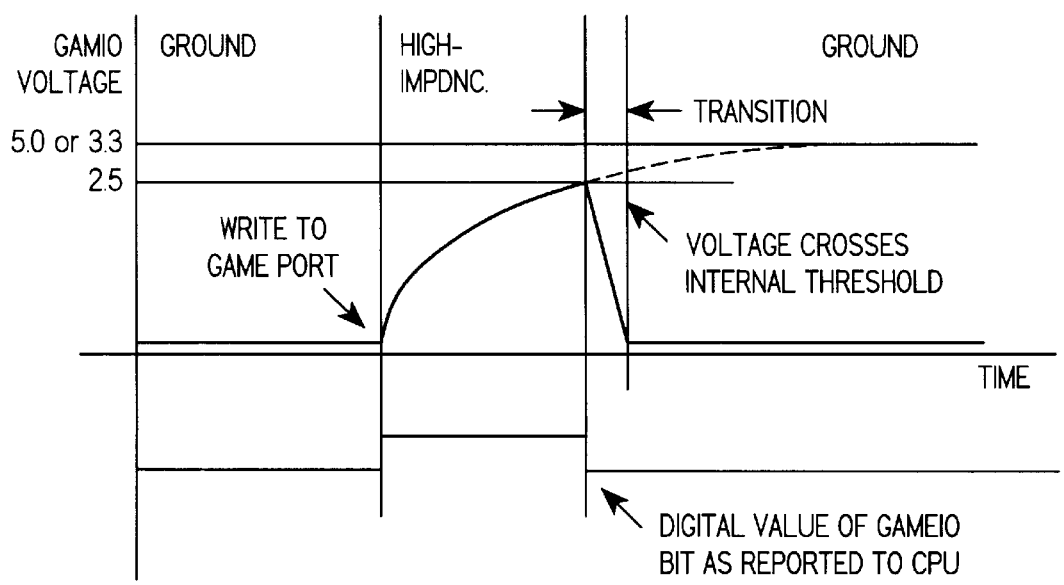
FIG. 14 is a timing diagram illustrating the functioning of the circuit in FIG. 12.

FIG. 14 shows a charging diagram for the operation of the circuit shown in FIG. 13. The four GAMIO pins (I/O terminals 1225) can be in three possible states: ground, high-impedance, and transition-to-ground. The time the RC circuit takes to charge up to 2.5 volts is determined by software sampling of the game port. Once the GAMIO voltage exceeds 2.5 volts, the comparator 1307 sends an indication to the GAMIO Control flip-flop 1309 which turns on transistor 1315 which causes the RC circuit to return to a ground state.

Figure 15:
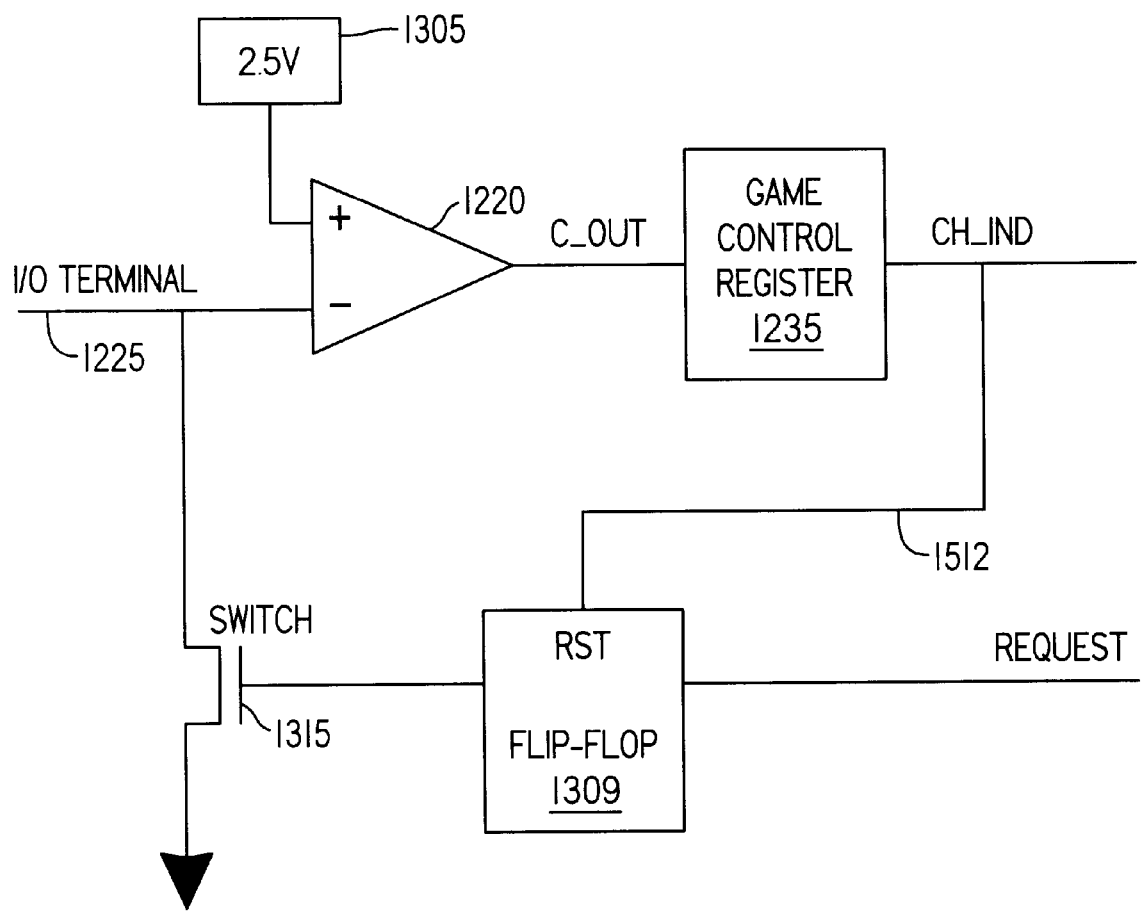
FIG. 15 is a schematic block diagram of game port logic for determining the X or Y position of a joystick.

In order to minimize current drain when game port status is not being determined, it may be advantageous to keep capacitor 1313 in a charged state. Referring to FIG. 15, showing game port logic 413, the request line is low when the status of the corresponding joystick is not being requested. Thus, switch 1315 is off, driving I/O terminal 1225 high. When I/O terminal 1225 is high, the output of comparator 1220 (C_OUT) is low. When the status of the joystick is requested by software, a request bit is set in game port status register 1210. A request signal is provided from game port status register 1210 to flip-flop 1309. The request signal is clocked to turn on switch 1315. I/O terminal 1225 transitions from high to low responsive to the switch being turned on. That is, the transistor of switch 1315 becomes conductive when switch 1315 is turned on, thereby driving I/O terminal low to ground. When the voltage of I/O terminal 1225 transitions to a value below the value of voltage source 1305 (e.g., 2.5V), the output of comparator 1220 transitions from low to high. The comparator output is provided to game control register 1235 which provides a charging indicator signal (CH_IND).

When the charging indicator signal transitions from low to high, flip-flop 1309 is reset to low, thereby turning off the switch and causing I/O terminal 1225 to begin charging. Alternatively, if flip-flop 1309 is a monostable multivibrator with an unstable, asserted value held long enough to pull I/O terminal 1225 to ground, reset line 1512 is not necessary. When the voltage of I/O terminal 1225 transitions to a value above the value of voltage source 1305 (e.g., 2.5V), the output of comparator 1220 transitions from high to low. Although the reset on flip-flop 1309 is released, the request line has been released also, allowing switch 1315 to remain off, thereby preventing unnecessary current draw. Game control register 1235 provides a done signal to game port status register 1210 via bus 207 when the charging indicator signal transitions low. The done signal is the charging indicator signal or a signal derived from the charging indicator signal. For example, done signal can be a latched, one bus cycle wide signal derived from the negative edge of the charging indicator signal. The done signal resets the request bit of game port status register 1210. The interval between the time that the request bit is asserted in game port status register 1210 and the time that the done signal is provided to game port status register 1210 to reset the request bit is indicative of the position of the joystick.

The description of the invention set forth herein is illustrative, and is not intended to limit the scope of the invention as set forth in the following claims. For instance, the invention has been described with the expansion bus being the ISA bus. In other embodiments, the expansion bus may be different. For instance, as PC architecture continues to evolve, the PCI bus may become the input/output bus that is presently the ISA bus in the embodiment described above and the legacy devices may be those that interface to the PCI bus today. In such an embodiment, the South Bridge would provide an interface between PCI legacy devices and the PCI bus. Other buses may also serve as the input/output or expansion bus such as the MCA bus. Furthermore, those skilled in the art will recognize that boundaries between logic blocks are merely illustrative and that alternative embodiments may merge logic blocks or impose an alternate decomposition of functionality for the game port. Thus, variations and modifications of the embodiments disclosed herein, may be made based on the description set forth herein, without departing from the scope and spirit of the invention as set forth in the following claims.

What is claimed is:

1. An apparatus comprising:

a game port interface including first and second game port portions, the first game port portion being on a first integrated circuit and interfacing to an I/O bus, and the second game port portion being on a second integrated circuit and providing I/O terminals to couple the game port interface to a peripheral device, the I/O terminals including at least first and second I/O terminals;

a bus coupling the first and second integrated circuits, the bus for serially transferring game port information between the first and second game port portions; and wherein the game port information is transferred between the first and second integrated circuits in frames, each frame including a predetermined number of data bits, each frame including a predetermined slot for predetermined bits of game port information, the bus being coupled to continuously transfer the state of the game port information between the first and second integrated circuits at a predetermined rate.

2. The apparatus of claim 1 wherein the game port information includes:

a request transmitted from the first game port portion to the second game port portion, the request requesting a check of a position of the peripheral device;

first data transmitted to the first game port portion from the second game port portion, the first data including
at least a done bit indicative of a voltage level of the first I/O terminal, the done bit indicating that the check is complete, and
at least another data bit indicative of a state of a button of the peripheral device.

3. The apparatus of claim 1 wherein the frames are transferred substantially continuously while the first and second integrated circuits are in a normal power mode, thereby providing for substantially contiguous frames continuously being transferred between the first and second integrated circuits while in the normal power mode.

4. The apparatus of claim 1 wherein the game port information is transferred from the first to the second integrated circuit in substantially continuous frames and from the second to the first integrated circuit in substantially continuous frames.

5. The apparatus of claim 2 wherein the first game port portion further includes a status register for storing status information indicative of status of the peripheral device, the status register being accessible from the I/O bus, the status register storing
information from the second I/O terminal, the information indicating one of a first and second states of the button; and
information from the second game port portion indicating a position of the peripheral device.

6. The apparatus of claim 5 wherein the second game port portion further includes
a position check circuit for tristating the first I/O terminal responsive to the request from the first game port portion, the position check circuit providing at least the done bit to the first game port portion when the first I/O terminal is charged to a predetermined voltage by the peripheral device.

7. The apparatus of claim 5 wherein the apparatus is a computer system, the apparatus further comprising:
a processor, the processor coupled to poll the status register in the first integrated circuit via the I/O bus to obtain changes in the game port information; and
a counter/timer coupled to the processor, the counter/timer providing information indicating the time between providing the request signal and receiving the done bit.

8. The apparatus of claim 6 wherein the comparator output provides the done bit to a latch, the latch providing the done bit to the bus.

9. A method of controlling a game port having first and second game port portions, the first game port portion being on a first integrated circuit and the second game port portion being on a second integrated circuit, the first and second integrated circuits being coupled by a bus, the second integrated circuit having I/O terminals for coupling to at least one game device, the I/O terminals including at least first and second I/O terminals, the method comprising:

sending a request for determining a position of the game device from the first game port portion to the second game port portion over the bus;

determining when a voltage level of the first I/O terminal reaches a predetermined voltage level and generating done information indicative thereof; and sending the done information from the second game port portion to the first game port portion via the bus, the bus transferring game port information substantially continuously between the first and second integrated circuits, and wherein the bus transfers the game port information in frames, each frame including a predetermined number of data bits, each frame including a predetermined slot for predetermined bits of the game port information, the game port information including the request and done information, the bus being coupled to continuously transfer the state of the game port information between the first and second integrated circuits at a predetermined rate.

10. The method of claim 9, wherein the determining comprises:
setting a respective switch in the second integrated circuit to tristate a corresponding I/O terminal in response to a request.

11. The method of claim 9, wherein the sending a request comprises:
sending four request bits from the first game port portion, each request bit requesting position information regarding an axis of movement of one of first and second joysticks, a first one of the four request bits requesting X-axis position information for the first joystick, a second one of the four request bits requesting Y-axis position information for the first joystick, a third one of the four request bits requesting X-axis position information for the second joystick, a fourth one of the four request bits requesting Y-axis position information for the second joystick.

12. The method of claim 9, wherein
the determining includes generating a done bit; and
the sending the done information includes transferring successive samplings of the done bit from the second integrated circuit to the first integrated circuit in frames, each frame including a predetermined number of data bits, each frame including a predetermined slot for each done bit, so as to continuously transfer the state of the done bit from the second integrated circuit to the first integrated circuit at a predetermined rate.

13. The method of claim 9, wherein the bus is a serial bus.

14. The method as recited in claim 9 further comprising:
receiving on the second I/O terminal state information indicating a state of a button on the game device; and
sending the state information from the second game port portion to the first game port portion via the bus.

15. The method as recited in claim 9 wherein sending the request further comprises asserting at least one bit in at least one frame of a plurality of frames of data being substantially continuously transferred from the first to the second game port portion and wherein sending the done information from the second game port portion to the first game port portion further comprises asserting one or more bits in one frame of a plurality of frames being transferred substantially continuously from the second to the first game port portion.

16. The method as recited in claim 9, further comprising:

transferring the frames substantially continuously between the first and second integrated circuits while the first and second integrated circuits are in a normal power mode, the frames being substantially contiguous.

17. The method as recited in claim 9 further comprising transferring the game port information from the first to the second integrated circuit in substantially continuous frames and simultaneously transferring the game port information from the second to the first integrated circuit in substantially continuous frames.

18. The method of claim 11, wherein the determining further comprises determining when voltage levels of four I/O terminals each reach a predetermined voltage level and generating four done bits indicative thereof, each done bit corresponding to each request bit;

the sending the done information further comprises:

sending the four done bits from the second game port portion to the first game port portion via the bus.

19. The method of claim 9, wherein the receiving includes receiving an input bit on the second I/O terminal, the input bit indicating a state of a button on the game device; and the sending the state information includes transferring successive samplings of the input bit from the second integrated circuit to the first integrated circuit in frames, each frame including a predetermined number of data bits, each frame including a predetermined slot for the input bit, so as to continuously transfer the state of the input bit from the second integrated circuit to the first integrated circuit at a predetermined rate.

20. The method of claim 14 wherein the receiving comprises:

receiving four input bits at the I/O terminals, each input bit indicating a state of a corresponding button of at least one game device.

21. A method of providing a partitioned game port comprising:

providing a first game port portion on a first integrated circuit;

providing a second game port portion on a second integrated circuit, the first and second game port portions providing a game port interface;

providing a bus between the first and second integrated circuits, the bus serially transferring game port information between the first and second game port portions;

providing I/O terminals on the second integrated circuit for coupling to at least one game device; and wherein the game port information is transferred between the first and second integrated circuits in frames, each frame including a predetermined number of data bits, each frame including a predetermined slot for predetermined bits of game port information, the bus being coupled to continuously transfer the state of the game port information between the first and second integrated circuits at a predetermined rate.

22. The method of claim 21 further comprising:

sending request information for determining a position of the game device to the second game port portion over the bus as part of the game port information;

determining responsive to the request information when a voltage level of the first I/O terminal reaches a predetermined voltage level and generating done information indicative thereof;

receiving on the second I/O terminal state information indicating a state of a button on the game device; and sending the done information and the state information from the second game port portion to the first game port portion via the bus as part of the game port information.

23. The method of claim 22 comprising:

transferring over the bus successive samplings of game port information bits as part of the game port information, the game port information bits including the request, done and state information, the successive samplings of the game port information bits being transferred between the first and second integrated circuits in the frames.

24. The method of claim 22 wherein the request information includes four request bits, each of the four request bits for determining a position in an axis of motion of at least one game device;

the done information includes four done bits, each of the four done bits corresponding to each of the four request bits; and the state information including four input bits, each input bit indicating a state of a corresponding button on the at least one game device.

* * * * *